(12) United States Patent
Saltzman et al.

(10) Patent No.: US 8,154,421 B2
(45) Date of Patent: Apr. 10, 2012

(54) REAL TIME TEMPERATURE AND LOCATION TRACKER

(75) Inventors: Greg D. Saltzman, Perkasie, PA (US);
Nancy H. Troutman, Miami, FL (US);
Scott A. Sheetz, Miami, FL (US);
Vladimir N. Lebedev, Miami, FL (US)

(73) Assignee: Fisher Clinical Services Inc., Allentown, PA (US)

( * ) Notice: Subject to any disclaimer, the term of this patent is extended or adjusted under 35 U.S.C. 154(b) by 405 days.

(21) Appl. No.: 12/464,193

(22) Filed: May 12, 2009

(65) Prior Publication Data
US 2010/0289669 A1 Nov. 18, 2010

(51) Int. Cl.
*G08C 19/12* (2006.01)
*G08C 19/16* (2006.01)

(52) U.S. Cl. .................................. 340/870.17

(58) Field of Classification Search ............... 340/870.17
See application file for complete search history.

(56) References Cited

U.S. PATENT DOCUMENTS

| | | |
|---|---|---|
| 6,326,892 B1 | 12/2001 | De La Forterie |
| 6,950,028 B2 | 9/2005 | Zweig |
| 7,102,526 B2 | 9/2006 | Zweig |
| 7,140,768 B2 | 11/2006 | Prabhakar |
| 7,142,110 B2 | 11/2006 | Schmidtberg et al. |
| 7,149,658 B2 | 12/2006 | Kadaba |
| 7,250,858 B2 | 7/2007 | Schmidtberg et al. |
| 7,332,482 B2 * | 2/2008 | Adorini et al. ................ 514/167 |
| 7,538,681 B1 | 5/2009 | Sharma et al. |
| 2007/0193297 A1 * | 8/2007 | Wilson ............................ 62/371 |
| 2009/0071270 A1 | 3/2009 | Petersen et al. |
| 2009/0102659 A1 * | 4/2009 | Evans et al. ................ 340/572.1 |

FOREIGN PATENT DOCUMENTS
EP 2 037 399 3/2009

OTHER PUBLICATIONS

*GPS Trailer Tracking*, Transcore Globalwave, from www.globalwave.com, available, on information and belief, at least as early Jan. 7, 2009, 2 pgs.

(Continued)

*Primary Examiner* — Dharti Patel
(74) *Attorney, Agent, or Firm* — Workman Nydegger

(57) ABSTRACT

A shipper having an outer housing with a temperature sensitive payload and a temperature/location tracker disposed therein. The outer housing has a body having an interior surface bounding a compartment that is accessed through an opening. A first panel is coupled with the body and configured to extend over at least a portion of the opening, with a first access port extending through the first panel. The payload and temperature/location tracker are disposed within the compartment of the body. The temperature/location tracker includes a first temperature probe, a GPS receiver, a cellular modem, and a GPS antenna. The GPS antenna is disposed so as to be aligned with the first access port when the shipper is in a fully assembled state such that the GPS antenna is directly accessible through the first access port. The temperature/location tracker monitors and periodically transmits temperature and location values of the shipper over a cellular communication network.

30 Claims, 14 Drawing Sheets

OTHER PUBLICATIONS

*GlobalWave 3300*, GlobalWave, from www.globalwave.com, available, on information and belief, at least as early as Jan. 7, 2009, 2 pgs.

*World's Smallest Global Positioning 16 Satellite Real Time Tracking System*, Brickhouse Security, from www.brickhousesecuity.com, available, on information and belief, at least as early as Jan. 9, 2009, 3 pgs.

*GPS and RFID Package Tracking*, EZINE Articles, from www.ezinearticles.com, available, on information and belief, at least as early as Jan. 9, 2009, 4 pgs.

*Welcome to Sky Shield USA, the Leader in GPS Tracking Technology*, Sky Shield USA, from www.skyshieldusa.com, available, on information and belief, at least as early as Jan. 9, 2009, 2 pgs.

"OnAsset Intelligence Medical Smartcontainer" from www.onasset.com, available upon information and belief at least as early as May 12, 2009.

Brochure for "SENTRY, Achieve Global Visibility with One Solution," from www.onasset.com, available upon information and belief at least as early as May 12, 2009.

\* cited by examiner

REAL TIME TEMPERATURE AND LOCATION TRACKER

CROSS-REFERENCE TO RELATED APPLICATIONS

Not applicable.

BACKGROUND OF THE INVENTION

1. The Field of the Invention

The present invention relates to shippers that contain real-time temperature and location trackers.

2. The Relevant Technology

Conventional temperature loggers are commonly used for measuring the temperature of an article as it is shipped between different locations. Specifically, there are many articles whose viability, life span, or other properties are dependent on maintaining the temperature of the article below a threshold temperature as the article is shipped between locations. For example, vaccines, cell cultures, and many other biological materials must continuously remain below a threshold temperature to remain viable.

To monitor the temperature of such articles during shipping, the article and a temperature logger are disposed within the chamber of an insulated shipping container. The temperature logger has a box shaped configuration that houses a temperature sensor, a small CPU with memory, and a battery. The temperature logger is manually activated just prior to being enclosed within the container. During transport of the container, the temperature logger monitors the temperature of the article by monitoring the surrounding temperature within the chamber of the shipping container. This can be accomplished by continuously recording the temperature within the container or by recording the temperature within the container each time the temperature exceeds a predetermined threshold.

Once the shipping container reaches its final destination, the container is opened and the temperature logger is located and manually turned off. Information from the temperature logger is then downloaded onto a computer where it is processed and analyzed to determine if the temperature of the article was maintained within an acceptable range during transport.

One of the shortcomings of the above system is that the shipping container must be opened and the temperature logger located and manually turned off before the temperature logger stops recording temperatures or temperature variations. That is, as the shipping container is opened, the temperature logger is exposed to ambient temperature conditions. The shipped article is typically moved quickly to a refrigerated compartment following opening of the container so as to maintain the article at the desired temperature. However, depending on the ambient temperature and the delay in finding and deactivating the temperature logger that remains within the shipping container, the temperature logger can be subject to and record elevated temperatures beyond the threshold temperature before deactivation of the temperature logger. This commonly occurs when the person unpacking the article forgets to turn off the temperature logger or significantly delays such deactivation.

Once the information on the temperature logger is processed and displayed, the elevated readings at the end of the logging period can falsely reflect that the article exceeded the temperature threshold, thus implying that the article is no longer viable. Because the owner of the article is unable to substantiate whether or not the article was indeed subject to the recorded elevated temperatures, out of an abundance of caution and safety, the owner of the article is often required to dispose of the article without use.

Another shortcoming with the above system is that neither the shipper nor the receiver is able to determine where the package is or what temperature variations have occurred until after the shipping container has reached its final destination. Thus, even if an elevated temperature occurs early in the shipping process, this does not become known until the package arrives at the final destination and the information on the temperature logger has been processed and displayed. Only at this time does the owner of the article know to send a second shipping container with a replacement article, which would then not arrive at the final destination until after also having gone through the entire shipping cycle. If the owner were to know in real time that the elevated temperature has occurred, he could send a replacement article at that time, instead of waiting for the original shipping container to arrive, thereby saving time.

Another shortcoming with the above system is that if an elevated temperature occurs during a shipment, the owner has no way of determining where that elevated temperature occurred. If, however, the owner were to know where elevated temperatures occurred, trends and other information could be obtained to determine and help correct the situations that cause the elevated temperatures to occur.

Accordingly, what are needed are systems or methods for overcoming all or some of the above shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
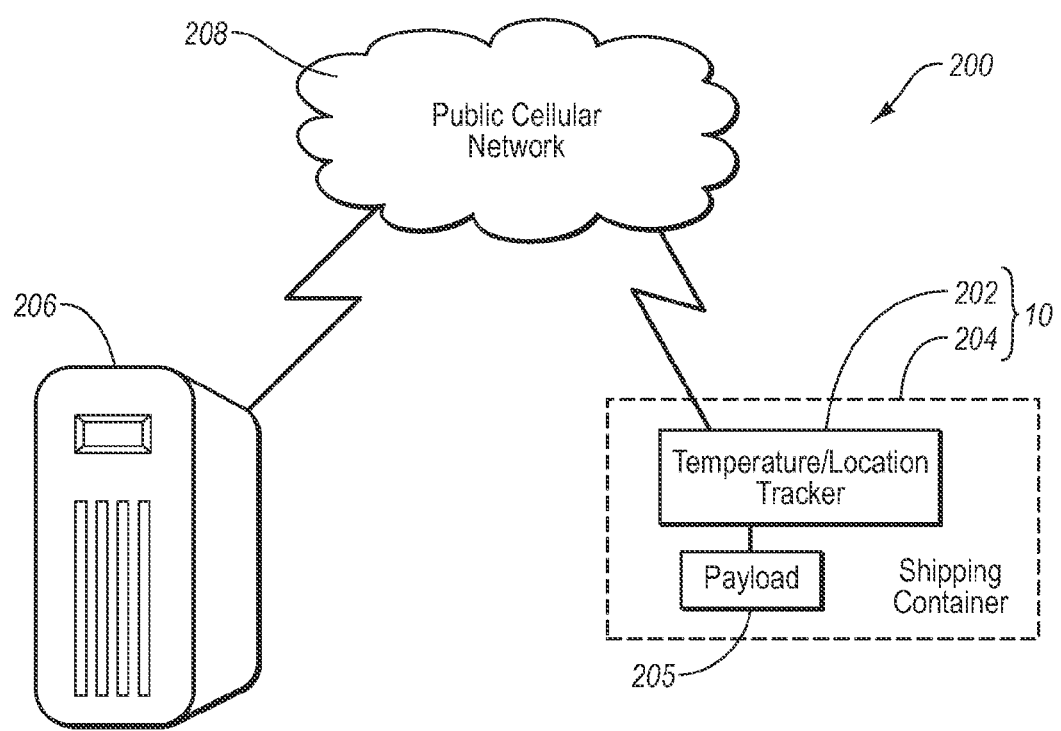
FIG. 1 is a block diagram of a system in which a temperature/location tracker can be used.

As shown in FIG. 1, set forth herein is a system 200 that includes a temperature/location tracker 202 that can be placed within a shipping container 204 to track the physical location and temperature(s) of the shipping container 204 and/or its payload 205 and transmit that information in real time or on a regular, pre-defined basis to a remote user 206 that is located away from the shipping container 204. The system 200 can be used, for example, in the supply chain management of pharmaceuticals, where temperature-controlled containers are used. The temperature/location tracker 202 is packaged within the shipping container 204 to form a shipper 10 and maintains a log of geographical location coordinates and corresponding temperature readings of the shipping container 204 taken periodically. The geographical location coordinates are determined through the use of global positioning system (GPS) and the temperature readings are taken using one or more temperature probes, as discussed below. In shipments where the payload 205 is placed within an insulated inner container, the temperature of both the payload 205 and the portion of shipping container 204 outside of the insulated inner container can be determined and logged.

The logged measurements are periodically transmitted to the remote user 206 by the temperature/location tracker 202 via a public mobile cellular telephone network 208, such as, e.g., a cellular network using the Global System for Mobile communication (GSM) and/or General Packet Radio Service (GPRS) standards. The data received by the remote user 206 can then be interfaced to a software system that can provide proactive notification to allow corrective action to be taken in regards to maintaining rules or correcting the temperature of the shipment contents. In many embodiments, the temperature/location tracker 202 is packaged for easy removal from the shipping container 204 so as to be reusable.

In various embodiments, temperature/location tracker 202 can be incorporated into standard or specialized customer packaging for temperature sensitive shipments. Temperature/location tracker 202 can also support remote programming to allow the temperature capture frequency to be defined, along with the minimum and maximum acceptable temperatures, as well as other parameters, as discussed below.

Figure 2:
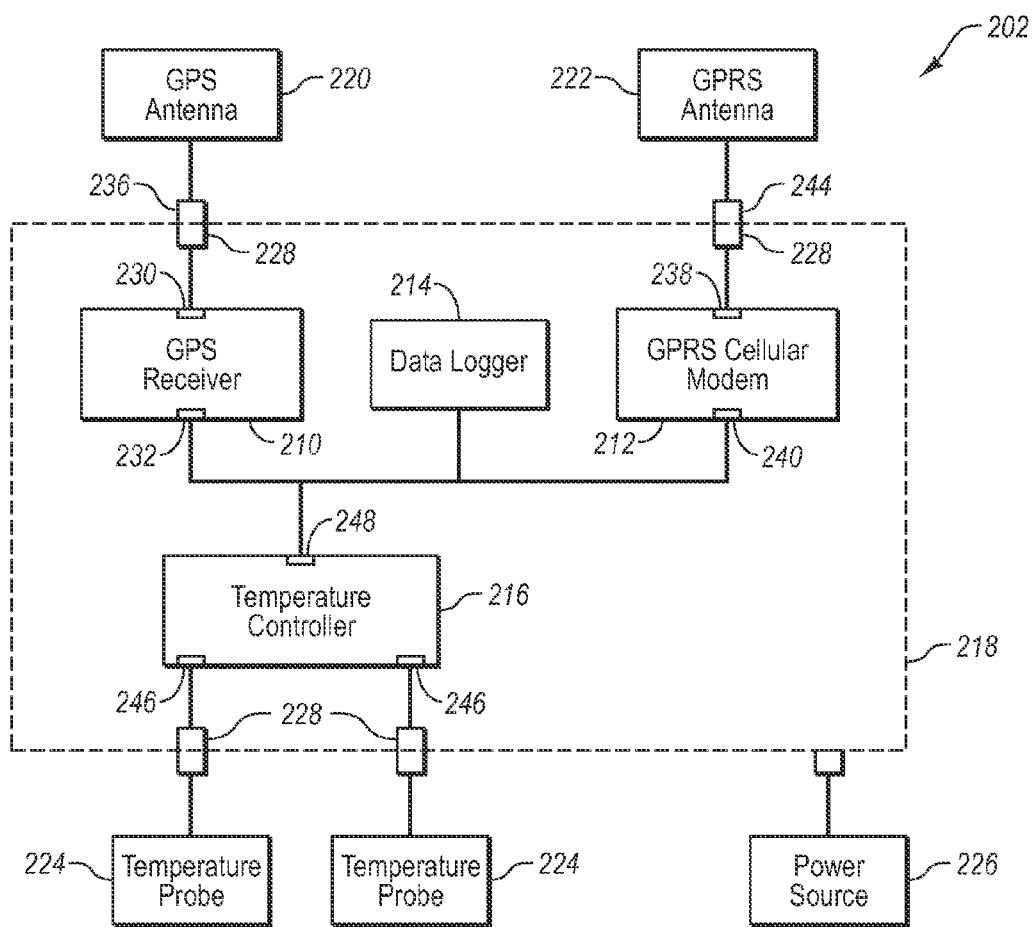
FIG. 2 is a block diagram of a temperature/location tracker according to one embodiment of the present invention.

Depicted in FIG. 2 is one embodiment of the temperature/location tracker 202 incorporating features of the present invention. In general, temperature/location tracker 202 comprises a GPS receiver 210, a cellular modem 212, a data logger 214 and a temperature controller 216 disposed within a housing 218, with a GPS antenna 220, a cellular antenna 222 (such as a GPRS antenna), one or more temperature probes 224 and a power source 226 disposed external to the housing 218. As shown in FIG. 2, the GPS antenna 220, cellular antenna 222, and temperature probes 224 are respectively connected to the GPS receiver 210, the cellular modem 212, and the temperature controller 216 through connectors 228 disposed on the housing 218. Alternatively, the antennas 220, 222 and probes 224 can connect directly to the respective GPS receiver 210, cellular modem 212, and temperature controller 216 without connecting to a connector 228 on the housing 218. The power source 226 is used to provide power to all of the components within the housing 218. In alternate embodiments, the power source 226 and one of the temperature probes 224 can be disposed within the housing 218, if desired.

The GPS receiver 210 receives signals from GPS satellites via the GPS antenna 220 and from those signals determines the geographical position of the temperature/location tracker 202 on the earth, as is known in the art. The GPS receiver 210 stores the geographical position in the data logger 214 at predefined intervals set up by the user, as discussed below. The GPS receiver 210 includes a GPS antenna input port 230 for connecting to the GPS antenna 220 either through a connector 228 on the housing or directly, and a communication port 232 for communicating with the cellular modem 212, the temperature controller 216, and the data logger 214.

Figure 3:
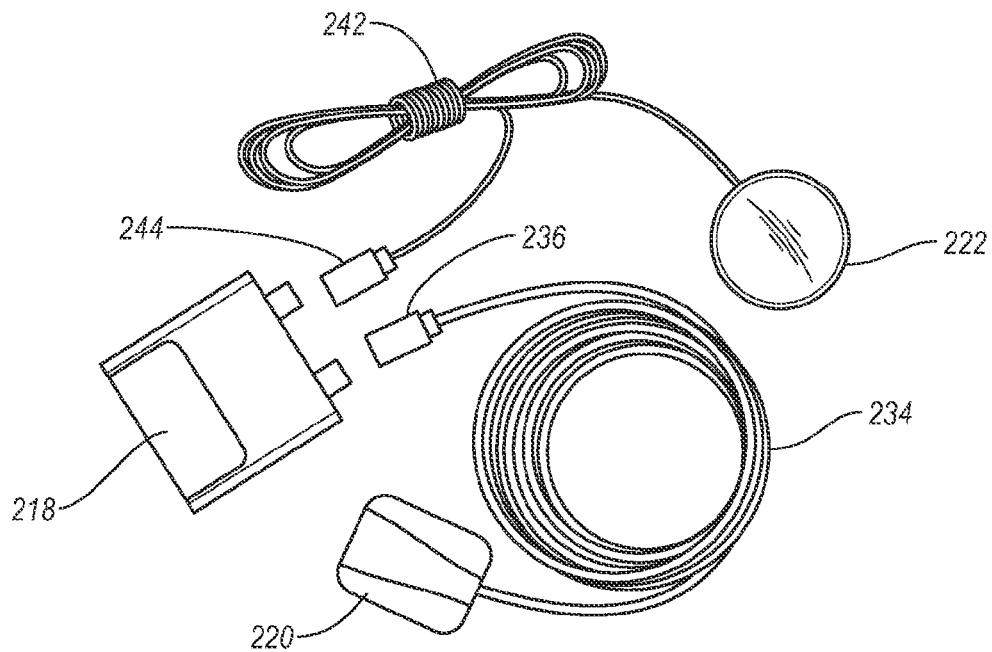
FIG. 3 is a top perspective view of a housing and antennas that can be used with the present invention.

As shown in FIG. 3, the GPS antenna 220 is a standard active or passive type, as is known in the art, with one end of a flexible electrical cable 234 attached thereto. Although the GPS antenna 220 is shown as having a substantially rectangular shape when viewed from above, other shapes are also possible, as is known in the art. For example, GPS antenna 220 can be substantially circular, rectangular or polygonal or can be irregularly shaped. A connector 236 is disposed at the other end of the cable 234 for attaching the cable 234 to the GPS receiver 210 either directly or through a connector 228 on the housing 218. In the embodiment depicted, the connector 236 comprises a standard FAKRA type connector. Other types of connectors can alternatively be used as long as a corresponding mating connector is also positioned on the housing 218 or GPS receiver 210. Alternatively, cable 234 can be directly hardwired to the GPS receiver 210, thereby eliminating the need for connectors 236 and 228. Most commercially available GPS receivers and antennas can be used.

Returning to FIG. 2, the cellular modem 212 receives and transmits data to/from the remote user 206 (FIG. 1) over cellular network 208, as is known in the art. The cellular modem 212 includes an antenna port 238 for connecting to the cellular antenna 220 either through a connector 228 on the housing or directly. The cellular modem 212 also includes a communication port 240 for communicating with the GPS receiver 210, the temperature controller 216, and the data logger 214. The cellular modem 212 transmits the geographical and the temperature data stored in the data logger 214 over the cellular antenna 222 to the remote user 206 for real-time analysis and review. The cellular modem 212 is set to transmit the data at predefined intervals set up by the user, as discussed below.

The cellular modem 212 also receives programming instructions from the remote user 206 (FIG. 1) over the cellular antenna 222 regarding the collection, storing, and transmitting of location and temperature data, and forwards those instructions to the temperature controller 216, again in real time. The cellular modem 212 also contains the ability to determine if no cellular communication channel is available due to, for example, being out of range. In that case, the cellular modem 212 will refrain from sending data to the remote user until a cellular communication channel has been restored. However, the logging of location and temperature information will continue and the cellular modem 212 will then send the stored data that would have been sent earlier along with the current data when the cellular communication channel is restored.

As shown in FIG. 3, the cellular antenna 222 is preferably a low-profile type, as is known in the art, with one end of a flexible electrical cable 242 attached thereto. A connector 244 is disposed at the other end of the cable 242 for attaching the cable to the cellular modem 212 either directly or through a connector 228 on the housing 218. In the embodiment depicted, the connector 244 comprises a standard FAKRA type connector. Other types of connectors can alternatively be used as long as a corresponding mating connector is also positioned on the housing 218 or cellular modem 212. Alternatively, cable 242 can be directly hardwired to the cellular modem 212, thereby eliminating the need for connectors 244 and 228. Most commercially available cellular modems and antennas can be used.

Returning to FIG. 2, the data logger 214 receives and stores information concerning the geographical position determined by the GPS receiver 210 and the corresponding temperature or temperatures determined by the temperature controller 216 and correlates the values, for example with a time stamp. It is from the data logger 214 that the cellular modem 212 retrieves the information to send to the remote user 206. The amount of information that can be stored in the data logger 214 can vary. For example, in one embodiment the data logger 214 can store up to 10,000 correlated temperature and location values, with other amounts possible.

In some embodiments, the GPS receiver 210, cellular modem 212 and the data logger 214 can be integrated into a single device. For example, the embodiment shown in FIGS. 3 and 4 combines the GPS receiver 210, cellular modem 212, and the data logger 214 into a single integrated housing 218. One example of such a system is the Evolution TT8740 manufactured by Skypatrol, LLC. Other commercially available devices can alternatively be used. The Evolution TT8740 has the ability to store up to 8,000 correlated temperature and location values and forward that information to the remote user 206 once connectivity is restored.

As shown in FIG. 2, the temperature controller 216 manages the collection and storage of temperature values and detects temperature events, such as temperature values higher than a pre-defined maximum limit, or lower than a pre-defined minimum limit. The temperature controller 216 stores the temperature data in the data logger 214 at predefined intervals set up by the user. The temperature controller 216 includes one or more temperature sensor input ports 246 for connecting to the temperature probes 224 and one or more communication ports 248 for communicating with the GPS receiver 210, the cellular modem 212, and the data logger 214.

The temperature controller 216 is designed to receive the temperature data from the temperature probes 224 and perform analysis on the data to determine temperature events, such as high temperature readings, low temperature readings or other temperature events. The temperature controller 224 is also designed to communicate with the GPS receiver 210 and cellular modem 212 to be able to send the collected data and notice of temperature events to the remote user 206 via the cellular modem 212. The temperature controller 216 also receives programming instructions via the cellular modem 212, as described in more detail below.

Figure 5:
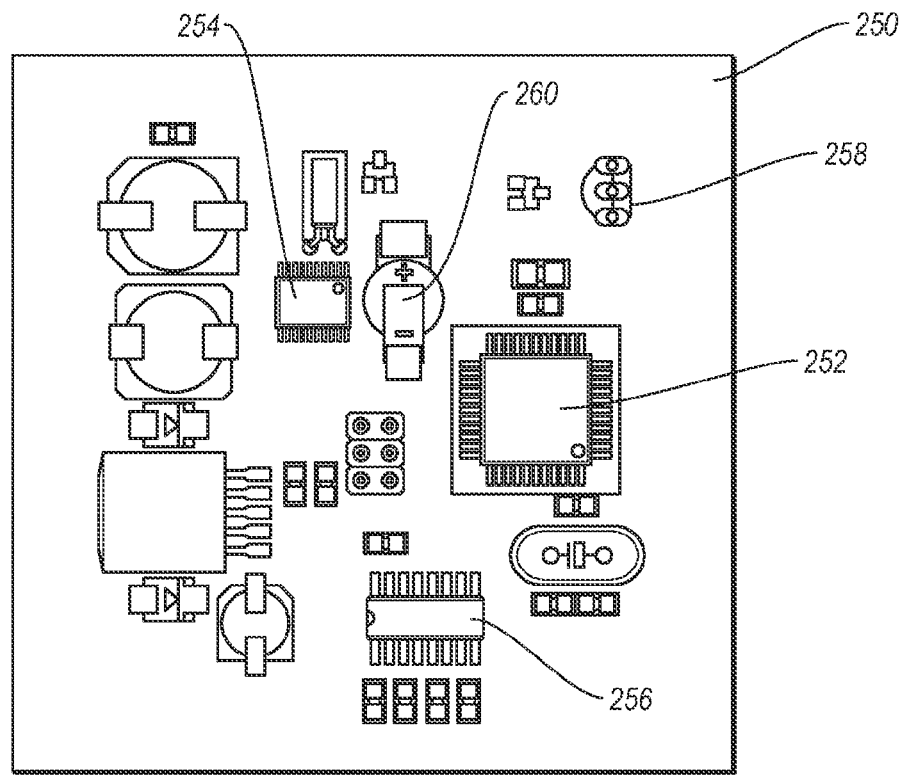
FIG. 5 is a plan view of an integrated circuit board layout of the temperature controller shown in FIG. 2.

As shown in FIG. 5, the temperature controller 216 comprises an electronic module 250 that includes a microcontroller 252 and a real-time clock 254 to go along with circuitry required for the communication port 248 and the temperature sensor input ports 246. For example, the temperature controller embodiment depicted in FIG. 5 also includes serial communication circuitry 256, temperature sensor input circuitry 258, power input circuitry 260 and other miscellaneous circuitry.

The real time clock 254 is utilized to manage the temperature reading intervals (based on the desired interval received from the user) and to provide a timestamp for each temperature event captured. The real-time clock 254 can be synchronized with the GPS clock if desired.

As noted above and in conjunction with FIG. 2, the communication ports 248 are used to communicate with the GPS receiver 210, the cellular modem 212, and the data logger 214. As also noted above, the temperature data is stored in the data logger 214 using the communication ports. Any other data that is to be sent to the remote user 206 from the temperature controller 216 or any commands that are received from the remote user 206 are sent between the cellular modem 212 and the temperature controller 216 using the communication ports 248.

The temperature sensor input ports 246 connect to the temperature sensor probes 224 and allow the temperature controller 216 to determine the temperature of the shipping container 204 and its payload 205, as discussed below.

As noted above, one or more temperature probes 224 are connected to the temperature controller 216. In the depicted embodiment two temperature probes 224 are used. This can be especially beneficial when using a shipping container 204 that has an insulated inner container in which the payload 205 is placed, as discussed below. By having two temperature probes 224, one can be positioned within the insulated inner container with the payload 205, and the other can be positioned outside of the insulated container. In this manner, the temperatures of both the payload 205 as well as the shipping container 204 can be simultaneously monitored if desired by the remote user 206. Of course, only one temperature probe 224 can be used, if desired. Likewise, three or more temperature probes 224 can alternatively be used.

Figure 6:
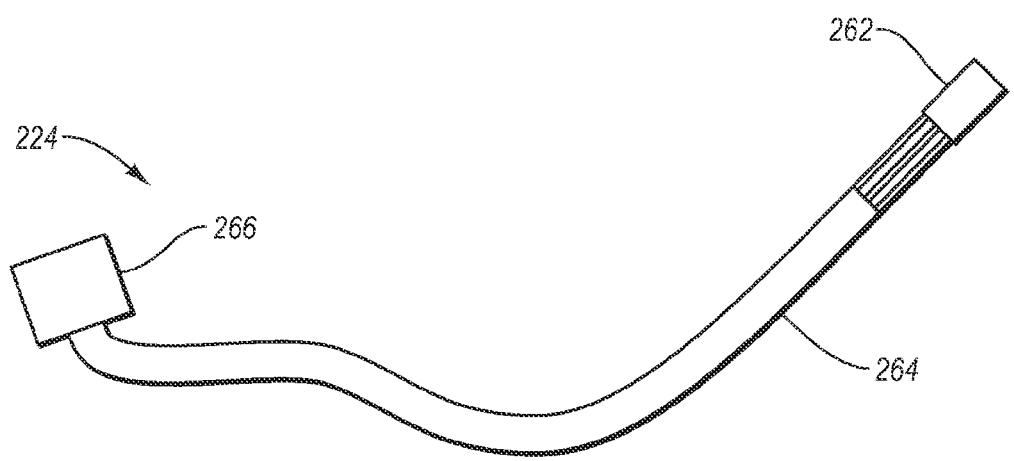
FIG. 6 shows a temperature probe that can be used in the present invention.

As shown in FIG. 6, each temperature probe 224 comprises a temperature sensor 262 as is known in the art, with one end of a flexible electrical cable 264 attached thereto. A connector 266 is disposed on the other end of the cable 264 so as to be able to attach to a mating connector 228 disposed on the housing 218 or on the temperature controller 216. For example, the exemplary temperature probe 224 shown in FIG. 6 is an integrated package wherein the temperature sensor 262 comprises an encapsulated type TO-92 temperature sensor, which is soldered to one end of a three-wire cable 264. The temperature sensor 262 and the cable 264 are typically sealed to prevent short circuits that could be created by moisture condensation. The connector 266 comprises a standard MOLEX 3-pin connector plug. Other types of temperature sensors 262 can alternatively be used. Similarly, other types of connectors 266 can alternatively be used as long as a mating connector is also positioned on the housing 218 or temperature controller 216. Alternatively, cable 264 can be directly hardwired to the temperature controller 216, thereby eliminating the need for connectors 266 and 228. Although electrical cable 264 can be of any desired length, electrical cable 264 commonly has a length in a range between about 10 cm to about 2 meters with about 1 meter to about 1.5 meters being common. Other lengths can also be used depending on the size of the shipping container 204 being used.

The flexibility and length of cable 264 allows the temperature sensor 262 to be inserted within the center or any other portion of the shipment packaging 204, allowing the monitoring and collection of the temperature of the shipping container 204 and/or the payload thereof. The flexibility of the cable 264 between the temperature sensor 262 and connector 266 supports multiple packaging configurations and allows the housing 218 to be remotely located within the package, reducing the environmental impacts of temperature and humidity on the core components of the temperature/location tracker 202.

As noted above with regard to FIG. 2, the GPS receiver 210, cellular modem 212, data logger 214, and the temperature controller 216 are disposed within the housing 218. As such, housing 218 needs to be sized so as to allow each of the aforementioned portions to be disposed inside. Furthermore, because the temperature/location tracker 202 is to be placed within a shipping container 204, the footprint of the housing 218 is designed to be small.

Figure 7:
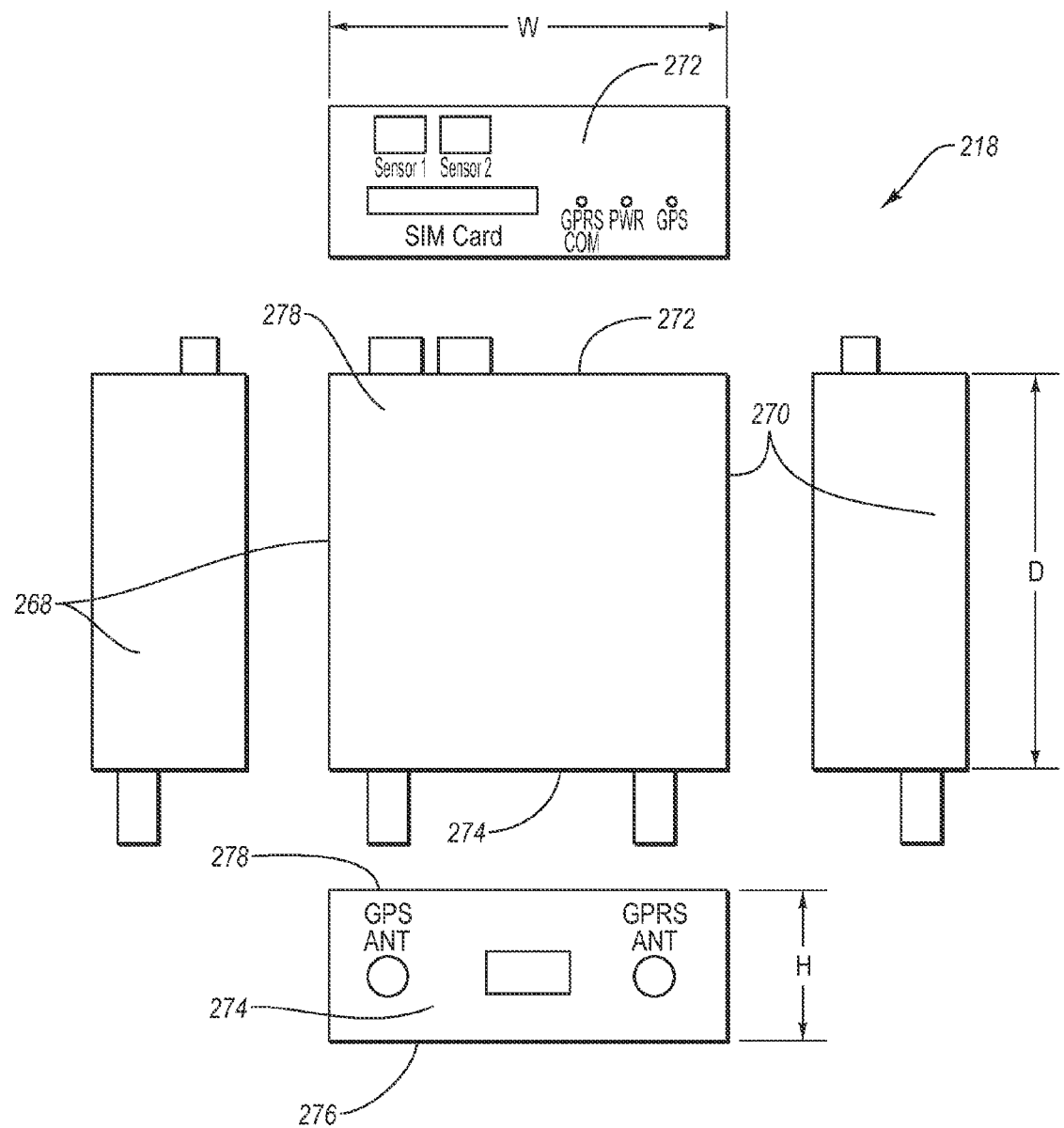
FIG. 7 shows various views of one embodiment of a housing and its exemplary dimensions.

FIG. 7 shows one embodiment of housing 218 which comprises a substantially square or rectangular low profile body. Housing 218 has two spaced apart side walls 268, 270 extending from a front wall 272 to a back wall 274. Each of the side walls 268, 270 and the front and back walls 272 and 274 extend from a floor 276 to a top section 278. Housing 218 is typically sized with a height H (i.e., distance from floor 276 to top section 278) in a range between about 20 mm to about 40 mm with about 20 mm to about 30 mm being more common; a width W (i.e., distance from side wall 268 to side wall 270) in a range between about 30 mm to about 100 mm with about 50 mm to about 70 mm being more common; and the depth D (i.e., distance from front wall 272 to back wall 274) in a range between about 30 mm to about 100 mm with about 50 mm to about 70 mm being more common. Other dimensions are also possible.

Figure 8:
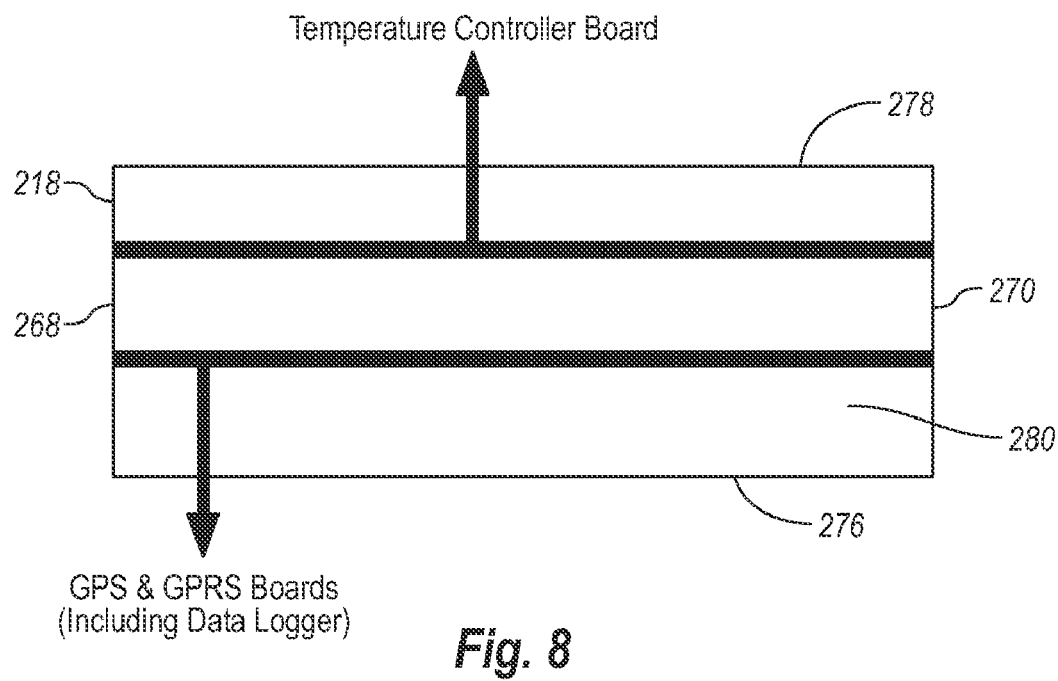
FIG. 8 is a side plan view showing the relative position of the temperature controller board with respect to the GPS receiver and cellular modem boards in the housing according to one embodiment.

As shown in FIG. 8 in conjunction with FIG. 7, the walls 268, 270, 272, 276, floor 276, and top section 278 combine to bound a compartment 280 in which the GPS receiver 210, cellular modem 212, data logger 214, and the temperature controller 216 are disposed. If desired, a commercially available housing can be used. For example, as noted above, the Evolution TT8740, which already contains a commercial GPS receiver and cellular modem that includes a data logger can be used, including its housing (see FIGS. 3 and 4). The Evolution TT8740 body has a width W and depth D of about 64 mm, and a height H of about 24 mm. The temperature controller board 216 can be inserted into the housing 218 as shown in FIG. 8, so as to be stacked above the GPS receiver and cellular modem modules.

It is appreciated that housing 218 can have any other desired configuration such as circular, triangular, or other polygonal or irregular configuration, as long as housing 218 can house the GPS receiver 210, cellular modem 212, data logger 214, and the temperature controller 216, as shown in FIG. 2.

Figure 9:
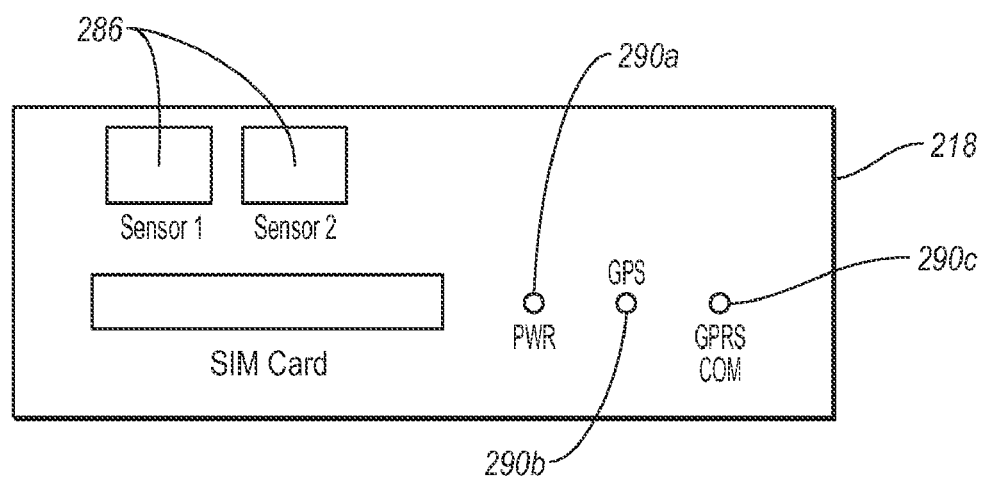
FIG. 9 is a front plan view of the housing shown in FIG. 3.

The temperature/location tracker 202 is typically designed to be reusable, with an expected life of the housing 218 to be greater than 5 years. A cheaper and more disposable housing 218 can alternatively be used, if desired. It is not intended for the housing 218 to be opened during normal or maintenance operations, although this can be done if desired. The housing 218 can also include connectors for the externally disposed portions of temperature/location tracker 202, as discussed previously. For example, as shown in FIGS. 4 and 9, the housing 218 includes a GPS antenna port 282, a cellular antenna port 284, two temperature probe ports 286, and a power port 288.

Figure 4:
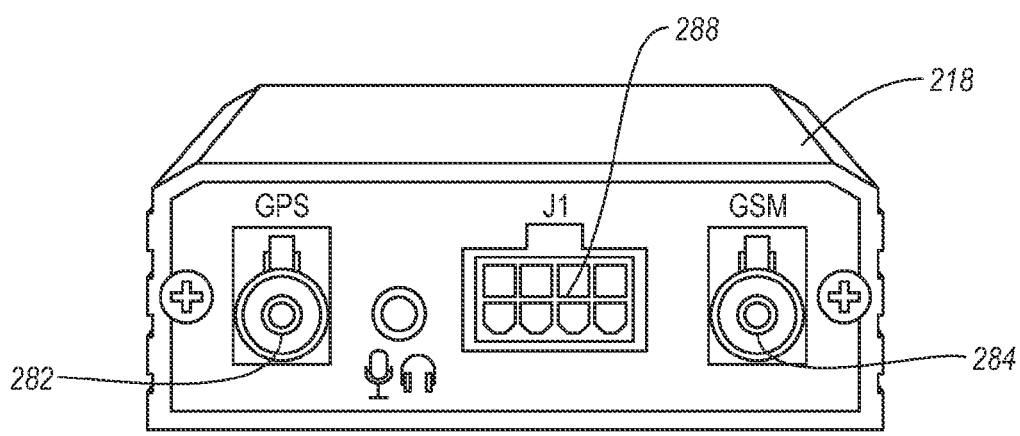
FIG. 4 is a back perspective view of the housing shown in FIG. 3.

Turning to FIG. 4, the GPS antenna port 282 supports the addition of the external GPS antenna 220, allowing the antenna 220 to be incorporated into the shipping package design and connected to the GPS receiver 210 via the GPS antenna port 282 during final package assembly. In the depicted embodiment, the GPS antenna port 282 comprises a standard FAKRA connector that mates with the FAKRA connector 236 of the GPS antenna 220 (see FIG. 3). Of course, other types of connectors can be used as long as the GPS antenna port 282 can mate with the GPS antenna connector 236.

The cellular antenna port 284 supports the addition of the external cellular antenna 222, allowing the antenna 222 to be incorporated into the shipping package design and connected to the cellular modem 212 via the cellular antenna port 284 during final package assembly. In the depicted embodiment, the cellular antenna port 284 comprises a standard FAKRA connector that mates with the FAKRA connector 244 on the cellular antenna 222 (see FIG. 3). Of course, other types of connectors can be used as long as the cellular antenna port 284 can mate with the cellular antenna connector 244.

The power port 288 allows for the external power source 226 to provide power to the components internal to the housing 218. In some embodiments, a programming port is also included that provides a serial connection to allow for 'connected' programming or troubleshooting of the temperature/location tracker 202. The programming port can be shared with the power port, if desired.

Returning to FIG. 9, the temperature probe ports 286 disposed on housing 218 are integrated with the temperature controller 216, allowing the temperature probes 224 to be included in the shipment packaging prior to final assembly with the temperature/location tracker 202. In the depicted embodiment, the temperature probe ports 286 comprise standard MOLEX 3-pin connectors that mate with the MOLEX connectors 228 on the temperature probes 224 (see FIG. 5). Of course, other types of connectors can be used as long as the temperature probe ports 286 can mate with the temperature probe connectors 228.

Additionally, various status indicators can be included on the housing 218 to indicate the status of various components within the housing 218. For example, the depicted embodiment includes three LEDs 290 integrated into the housing 218 that indicate the status of the system.

The first LED 290a, labeled "PWR" in the depicted embodiment, indicates if the GPS module has power. The LED 290a is on when power is provided and the GPS is operational. The second LED 290b, labeled "GPS" in the depicted embodiment, indicates the status of the GPS receiver 210. If the LED 290b is off, valid GPS information has not been received and a GPS fix has not been obtained; if the LED 290b is on, a valid GPS fix has been obtained. The third LED 290c, labeled "GPRS COM" in the depicted embodiment, indicates the status of the cellular connection, in this case using the GSM/GPRS standard. If the LED 290c is off, the temperature/location tracker 202 is not attempting to connect to the cellular network 208; if the LED 290c is blinking, the temperature/location tracker 202 is attempting to connect and register on the cellular network 208; and if the LED 290c is on, the connection to the cellular network 208 has been established.

Of course other types of housings, commercially available or not, can alternatively be used. Furthermore, if desired, the power source 226 and one or more of the temperature probes 224 can also be enclosed within the housing 218.

Returning to FIG. 2, the external power source 226 provides the necessary power to support the temperature/location tracker 202 during the shipment. The power source 226 is provided as a separate component to allow for replacement in case of extended shipment periods. Batteries can be used for the power source 226, such as one or more alkaline batteries. If a rechargeable power source is desired, one or more Lithium-Ion, Nickle Metal Hydride or the like batteries can be used. Other types of batteries or other power supplies can alternatively be used. Furthermore, if space is available, the power source 226 can be positioned inside the housing 218, if desired.

Figure 10:
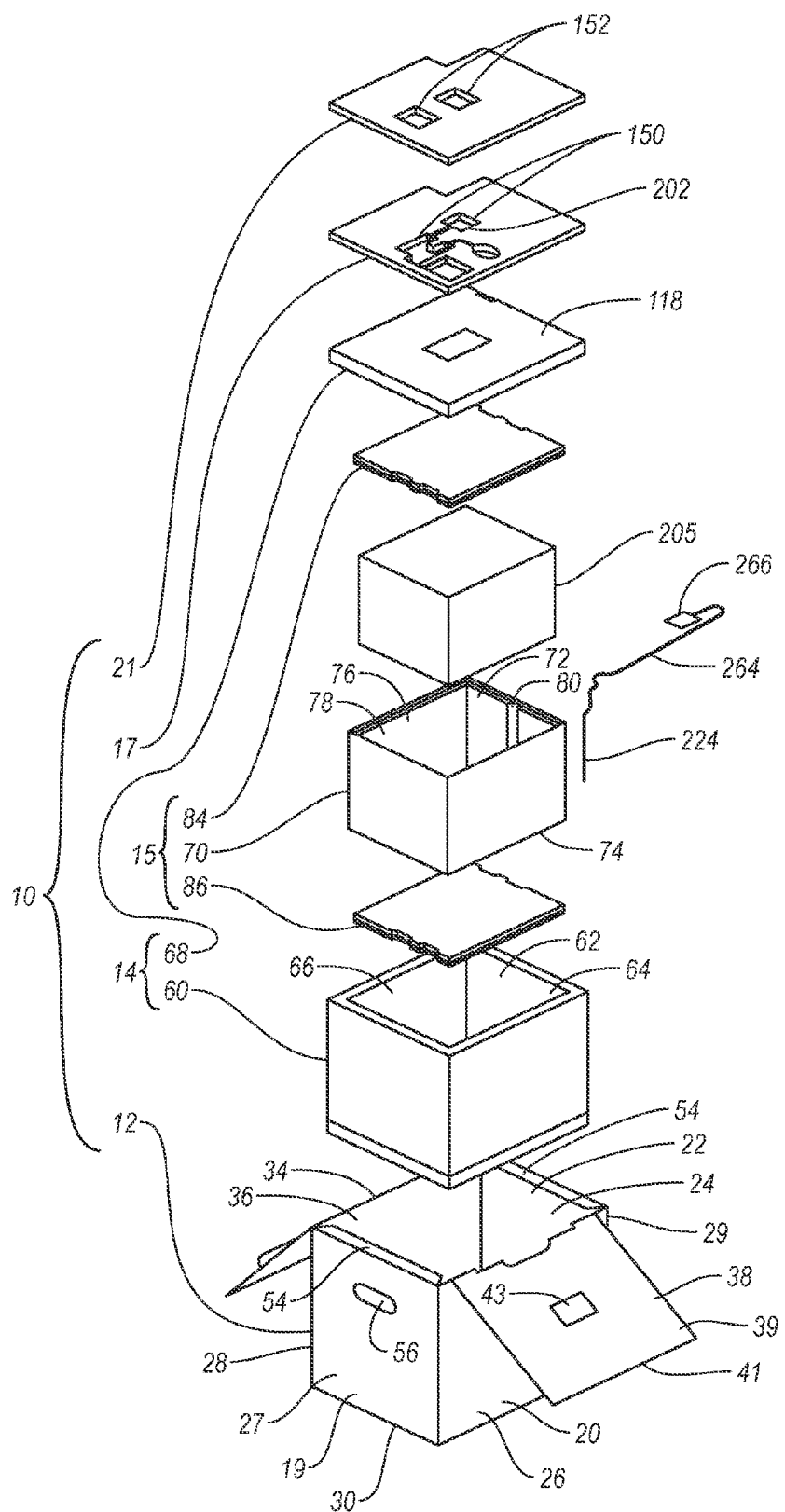
FIG. 10 is an exploded view of a shipper for transporting a payload and monitoring the temperature and location thereof according to one embodiment of the present invention.

Depicted in FIG. 10, is one embodiment of a shipper 10 incorporating the temperature/location tracker 202 described above. Shipper 10 is configured to transport a payload 205. Shipper 10 can incorporate a custom made shipping container or a modified standard, commercially available shipping container. Either way, the shipper 10 incorporates the temperature/location tracker 202 within the shipping container 204 (FIG. 1) to track the temperature and location of the payload 205 and the shipping container 204 as the shipper 10 moves through the shipping channels and broadcast that temperature and location information in real time to the remote user 206.

In general, shipper 10 comprises an outer housing 12, an insulation assembly 14 that is disposed within outer housing 12, a cooling assembly 15 that is disposed within insulation assembly 14, and an upper layer 17 that houses the temperature/location tracker 202. Payload 205 is selectively disposed within shipper 10 for transport between desired locations. Payload 205 can comprise any type of goods where it is important or desired to monitor the temperature of the payload during transport. For example, payload 205 can comprise cell cultures, vaccines, tissue, blood, pharmaceuticals, food, or any other type of biological or organic matter. The payload can also comprise non-organic matter, such as payload specialty chemicals. In the depicted embodiment, payload 205 is shown as including a box in which the specific temperature sensitive goods are disposed. In alternative embodiments, box 205 can be eliminated and any other type of carrier can be used. Furthermore, the carrier can be eliminated and the raw payload can be stored within shipper 10.

Outer housing 12 comprises a six-sided, parallelepiped box 20 having an interior surface 22 that bounds a compartment 24. Box 20 includes a body 19 having a front panel 26, an opposing back panel 28, opposing side panels 27 and 29 extending therebetween, and a floor panel 30 from which panels 26-29 upstand. Each panel 26-29 terminates at an upper edge 34 that bounds an opening 36 to compartment 24. Hingedly mounted to upper end 34 of front panel 26 is a top inside panel 38 having an interior face 39 and an opposing exterior face 41.

An access port 43 extends through top inside panel 38 between interior face 39 and opposing exterior face 41. As will be discussed below in greater detail, access port 43 is sized and positioned so that when shipper 10 is completely assembled, GPS antenna 220 will be positioned either at least partially within or directly below access port 43 so as to be directly accessible through access port 43. Accordingly, access port 43 has a cross-sectional size that allows such access. In some embodiments, access port 43 is generally circular with a diameter between about 30 mm to about 100 mm with about 35 mm to about 60 mm being common. In other embodiments access port 43 is generally rectangular with each side having a length between about 20 mm to about 100 mm with about 35 mm to about 70 mm being common. Other shapes are also possible. In some embodiments, access port 43 has a cross-sectional area that is between about 500 mm$^2$ to about 10,000 mm$^2$ with about 700 mm$^2$ to about 5000 mm$^2$ being common and about 1000 mm$^2$ to about 3000 mm$^2$ being more common. Other sizes and areas are also possible.

Although depicted as being generally centrally located on top inside panel 38, access port 43 can alternatively be positioned near any of the edges, or generally anywhere on top inside panel 38, as long as the GPS antenna 220 can be positioned within or directly below the access port 43 to allow direct access to the GPS antenna 220 through access port 43.

Figure 11:
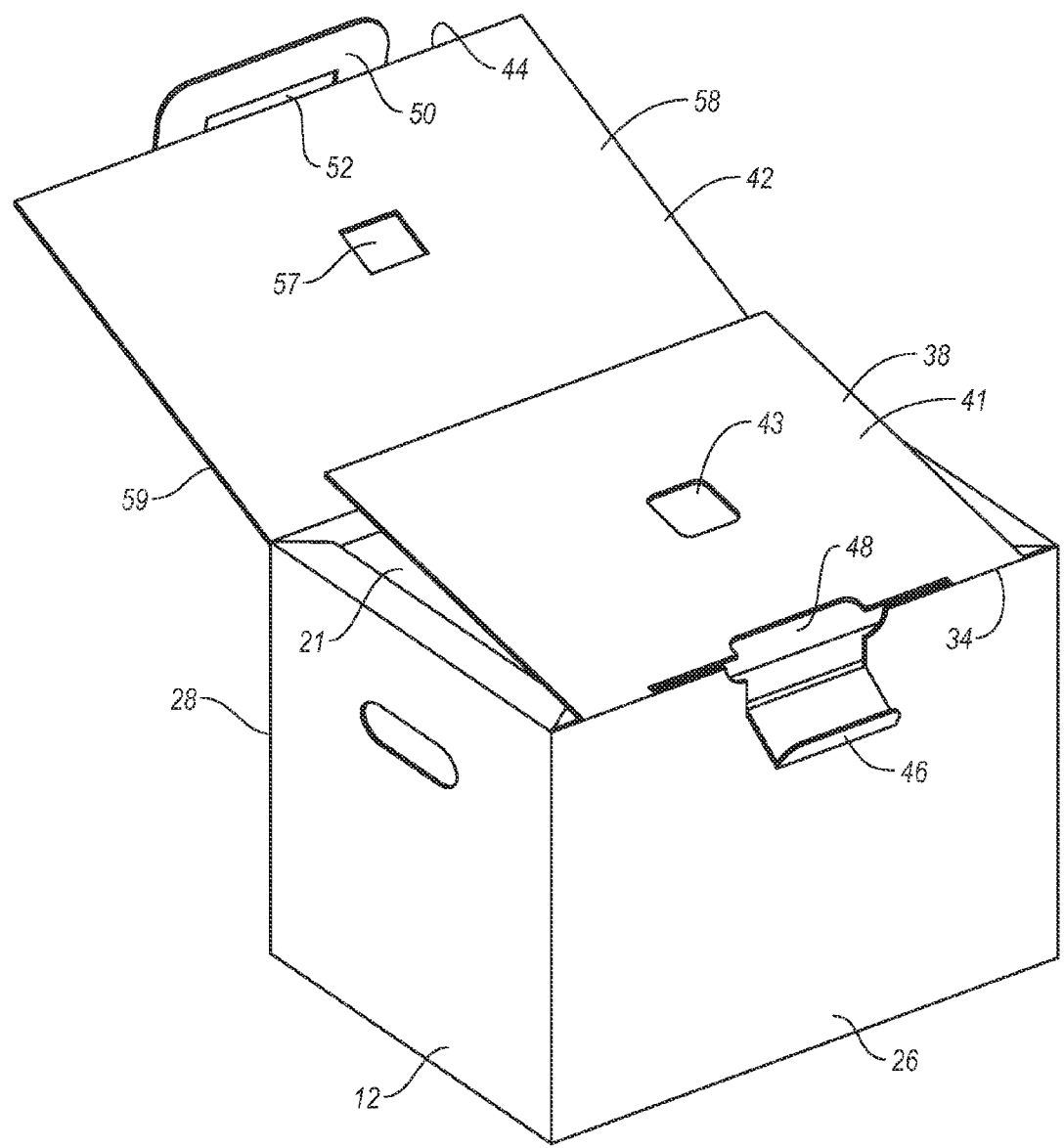
FIG. 11 is a perspective view of the fully assembly shipper shown in FIG. 10 wherein the outer housing is partially closed.

As depicted in FIG. 11, top inside panel 38 is configured to fold over and substantially cover opening 36. As shown thereat, a locking tab 46 is hingedly formed on front panel 26. Locking tab 46 is centrally formed on front panel 26 adjacent to upper edge 34 thereof. Locking tab 46 is formed by cutting out an adjacent section of front panel 26 and top inside panel 38 so that an engagement slot 48 is formed adjacent to locking tab 46.

Outer housing 12 also includes a top outer panel 42 hingedly coupled to upper edge 34 of back panel 28. Top outer panel 42 has an interior face 58 and an opposing exterior face 59. Top outer panel 42 has a front edge 44 from which an engagement tab 50 centrally projects. A locking slot 52 centrally extends through engagement tab 50 adjacent to front edge 44. Once top inside panel 38 is folded over opening 36, top outer panel 42 is folded over top inside panel 38 and engagement tab 50 is received within engagement slot 48. As depicted in FIG. 7, locking tab 46 is then received within locking slot 52, thereby securing top panels 38 and 42.

Similar to access port 43 within top inside panel 38, a second access port 57 extends through top outer panel 42 between interior face 58 and exterior face 59. As will be discussed below in greater detail, second access port 57 is positioned on top outer panel 42 so as to be disposed directly above access port 43 of inside panel when top outer panel 42 is folded over top inside panel 38. As a result, when shipper 10 is completely assembled, GPS antenna 220 will also be positioned either at least partially within or directly below second access port 57 so as to be directly accessible through access port 57. As such, GPS antenna 220 will be accessible through both access ports 43 and 57 when the shipper 10 is fully assembled.

Second access port 57 has a cross-sectional size and area that is generally about the same as the cross-sectional size of access port 43. As such, second access port 57 can comprise any of the sizes and areas discussed above with regard to access port 43. Also, similar to access port 43 on top inside panel 38, although depicted as being generally centrally located on top outer panel 42, second access port 57 can alternatively be positioned near any of the edges, or generally anywhere on top outer panel 42, as long as the second access port 57 is positioned above access port 43 to allow direct access to the GPS antenna 22.

Figure 12:
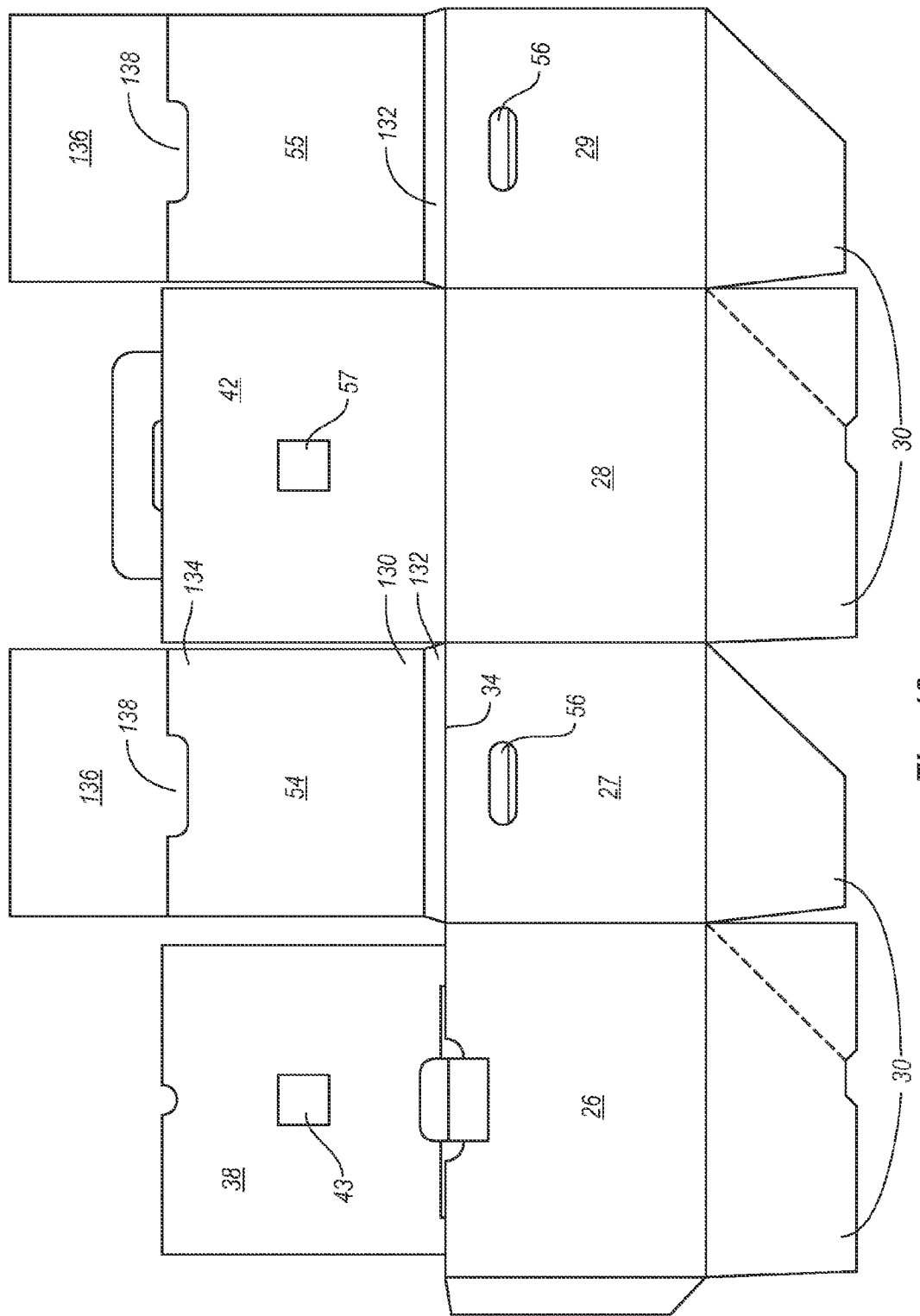
FIG. 12 is a top plan view of the outer housing shown in FIG. 10 in an unfolded state.

Returning to FIG. 10, in the depicted embodiment outer housing 12 also comprises an inner side panel 54 coupled with side panel 27 and an inner side panel 55 coupled with side panel 29. More specifically, depicted in FIG. 12 is a top plan view of outer housing 12 in an unfolded state. As shown therein, floor 30 is comprised of a plurality of members that are folded together to form floor 30. As also shown therein, inner side panels 54 and 55 have a length substantially the same as the length of side panels 27 and 29, respectively, but a slightly narrower width. This enables inner side panels 54 and 55 to be easily folded into compartment 24.

Inner side panel 54 has an upper end 130 with an elongated upper spacer 132 hingedly attached to and extending between upper edge 34 of front panel 27 and upper end 130 of inner side panel 54. Inner side panel 54 also has a lower end 134 having an inner floor panel 136 hingedly coupled to and extending therefrom Inner floor panel 136 includes a lower spacer 138 that is centrally cut from lower end 134 of inner side panel 34. Lower spacer 138 has a width substantially the same size as upper spacer 132. During use, inner side panel 34 is folded into compartment 24 so that inner floor panel 136 orthogonally projects from inner side panel 54 and rests on the interior surface of floor 30. In this configuration, upper spacer 132 functions to keep the upper ends of side panel 27 and inner side panel 54 spaced apart. Similarly, lower spacer 138 biases against the inside face of side panel 27 so as to keep the lower ends of side panel 27 and inner side panel 54 spaced apart. The same spacers and inner floor panel are also formed on inner side panel 55 and are identified by like reference characters.

When insulation assembly 14 is positioned within compartment 24, as will be discussed below in greater detail, inner side panels 54 and 55 hold insulation assembly 14 secure within compartment 24 at a spaced apart distance from each side panel 27 and 29. A handle opening 56 extends through each side panel 27 and 29. Because of the gap formed between side panels 27, 29 and inner side panels 54, 55, a handler can easily insert his/her fingers within handle openings 56 for lifting carrier 10. In alternative embodiments, inner side panels 54 and 55 can be eliminated and insulation assembly can fit snug against the interior surface of side panels 27 and 29.

Outer housing 12 is typically comprised of conventional cardboard. However, outer housing 12 can alternatively be made of other conventional building materials such as plastic, fiberglass, wood, composite, and the like. It is appreciated that outer housing 21 can have any desired shaped and can be modified into any desired 3-dimensional configuration that bounds a chamber.

Returning to FIG. 10, insulation assembly 14 can comprise any arrangement of insulating structures comprised of any desired insulating materials that house, insulate, and protect payload 205 within outer housing 12. Although one specific example of insulation assembly 14 is given herein, it is appreciated that a large variety of alternative structures and materials can be used for insulation assembly 14.

In the depicted embodiment, insulation assembly 14 comprises an inner housing 60 having a five sided, parallelepiped boxed shaped configuration. Inner housing 60 has an interior surface 62 that bounds a cavity 64. Cavity 64 is accessed through an opening 66. Inner housing 60 is configured to be received within compartment 24 of outer housing 12 as discussed above and as depicted in FIG. 13. A lid 68 is configured to mate with inner housing 60 so as to cover opening 66. In the depicted embodiment, inner housing 60 and lid 68 are comprised of panels bounding a vacuum formed compartment. Alternatively, however, housing 60 and lid 68 can be comprised of any conventional insulating material.

Figure 14:
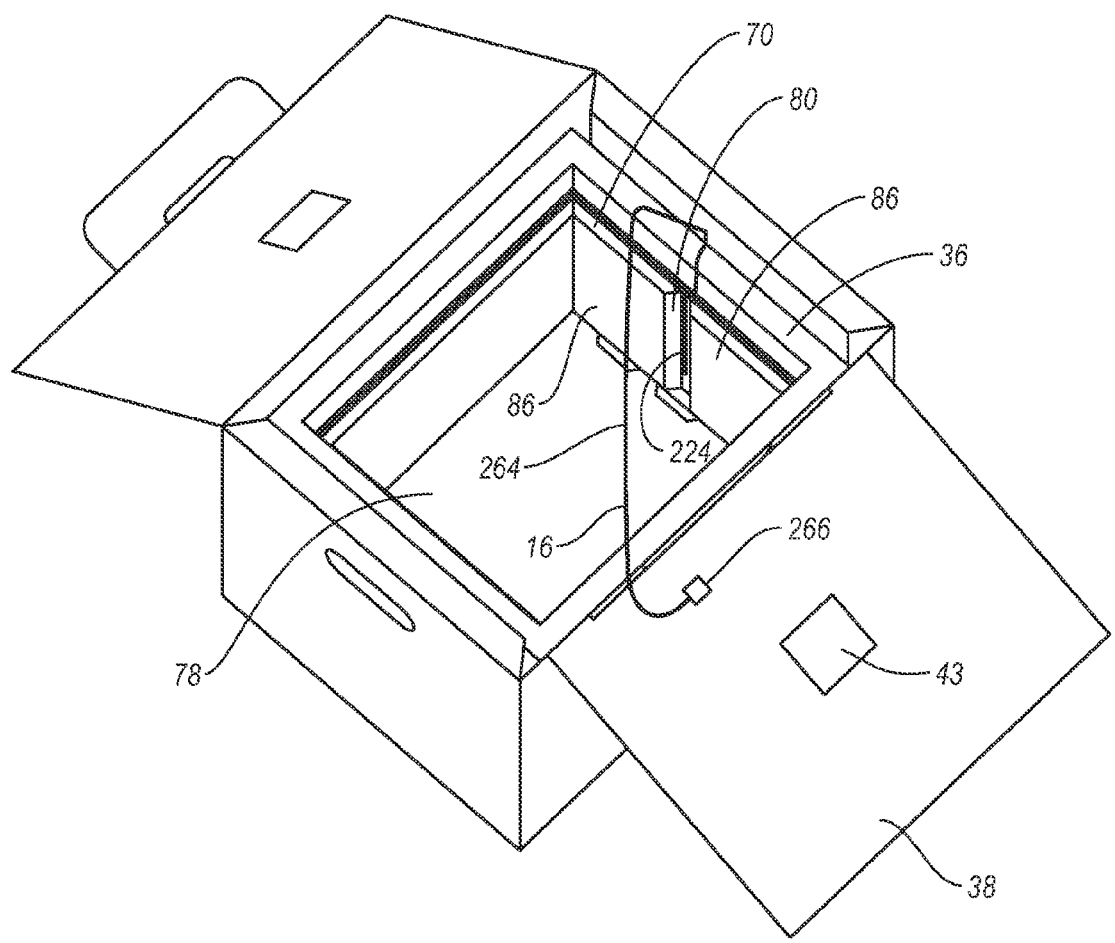
FIG. 14 is a top perspective view of the partially assembled shipper shown in FIG. 10 with a temperature probe positioned thereon.

As depicted in FIG. 10, cooling assembly 15 comprises a four sided, parallelepiped shaped sleeve 70 having a top opening 72 and an opposing bottom opening 74. Sleeve 70 has an interior surface 76 that bounds a compartment 78 that extends between opposing openings 72 and 74. As shown in FIG. 14, a V-shaped channel 80 centrally extends along interior surface 82 of opposing sides of sleeve 70 between opposing openings 72 and 74 (FIG. 10). Compartment 78 is configured to selectively receive payload 205.

Returning to FIG. 10, cooling assembly 15 further includes a separate top panel 84 and floor panel 86 that are configured to mate with sleeve 70 so as to selectively cover top opening 72 and opposing bottom opening 74, respectively. Sleeve 70, top panel 84 and floor panel 86 are configured to be snugly received within cavity 64 of inner housing 60 and are typically comprised of hollow polymeric panels that are filled with a liquid that can be selectively frozen. The liquid can be water, a water based solution, or other solutions that can be frozen. The panels can be rigid or formed from one or more flexible polymeric sheets that are welded together. It is again appreciated that cooling assembly 15 can have any desired configuration and need only be designed to be received within cavity 64 of inner housing 60 and be able to provide a cooling influence on payload 205.

Figure 13:
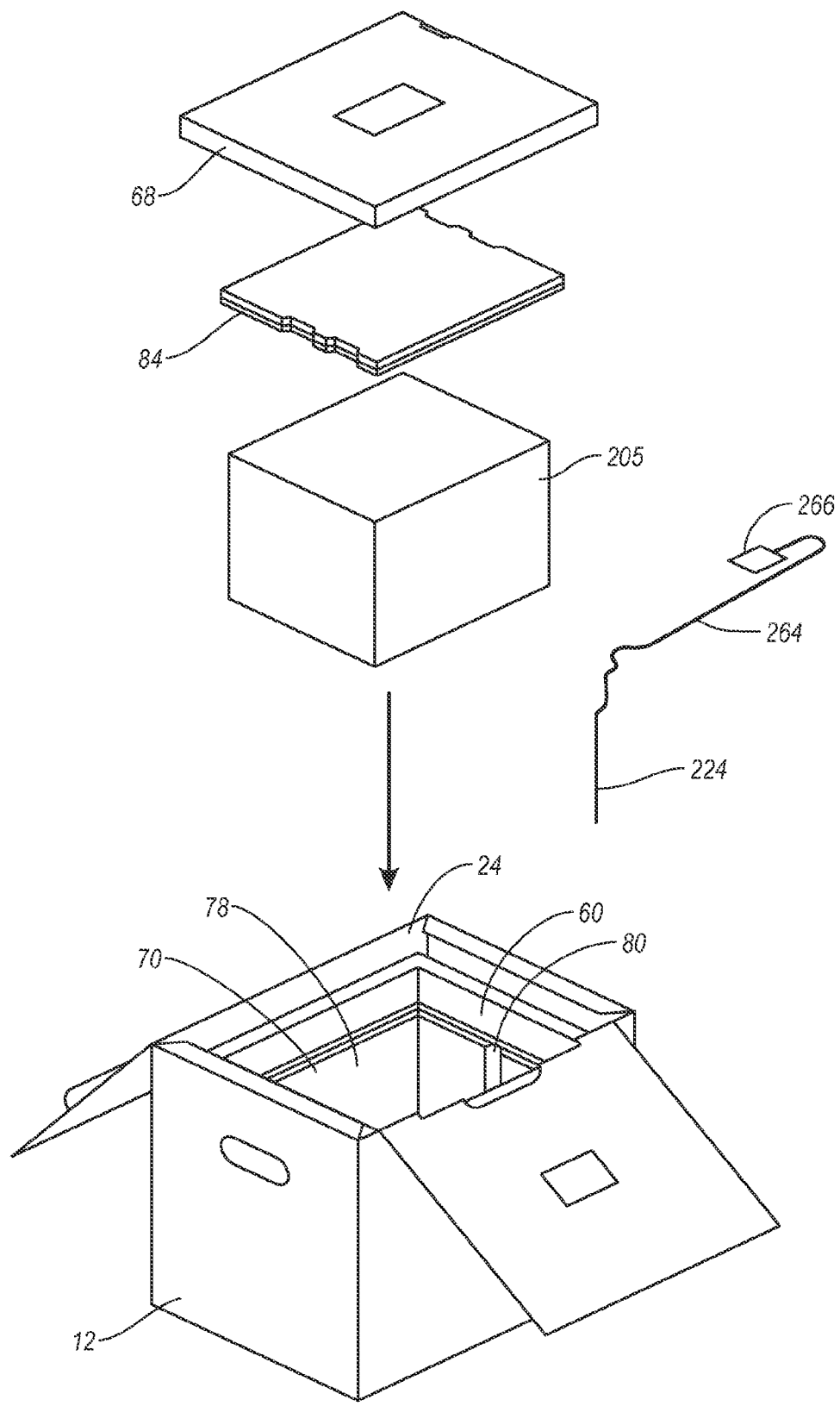
FIG. 13 is a perspective view of the shipper shown in FIG. 10 in a partially assembled state.

During assembly, inner housing 60 of insulation assembly 14 is received within compartment 24 of outer housing 12. Floor panel 86 and sleeve 70 of cooling assembly 15 are then positioned within cavity 64 of inner housing 60 as depicted in FIG. 13. In this position, one of the temperature probes 224 is disposed within sleeve 70, with elongated cable 264 extending from the temperature probe 224 and out of inner housing 60 and outer housing 12.

During use, payload 205 is received within compartment 78 of sleeve 70 with temperature probe 224 being disposed within channel 80 (FIG. 14) of interior surface 82 of sleeve 70 adjacent to payload 205. Electrical cable 264 extends along channel 80 and out of sleeve 70. Top panel 84 is then mounted on sleeve 70 following which lid 68 is mounted on first inner housing 60 so that payload 205, temperature probe 224, and sleeve 70 are enclosed within insulation assembly 14 but the end of elongated cable 264 that contains connector 266 extends outside of insulation assembly 14. In this configuration, temperature probe 224 (FIG. 14) is substantially sealed within compartment 78 of sleeve 70 adjacent to payload 205 so that temperature probe 224 accurately senses the temperature of payload 205 within compartment 78.

In alternative embodiments, channels 80 on sleeve 70 are not required. Rather, temperature probe 224 can simply be inserted directly between payload 205 and interior surface 76 of sleeve 70. In still other embodiments, different ports or channels can be formed on or through sleeve 70, top panel 84, and/or floor panel 86 for receiving temperature probe 224 and/or electrical cable 264.

Figure 15:
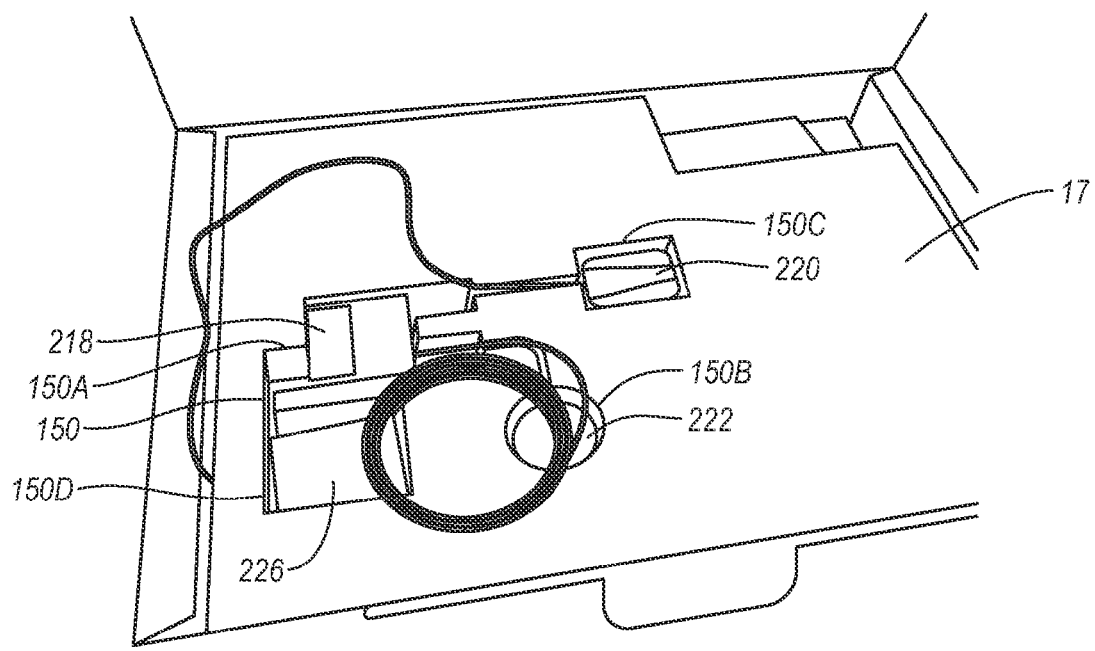
FIG. 15 is a perspective view of the fully assembled shipper shown in FIG. 10 with the outer housing open and excluding the second upper layer.

Returning to FIG. 10, upper layer 17, which houses the temperature/location tracker 202, is placed above a top surface 118 of lid 68 of insulation assembly 14. Upper layer 17 has cutouts or recesses 150 formed therein. As shown in FIG. 15, the components of temperature/location tracker 202 are removably positioned and secured within the cutouts or recesses 150. For example, in the depicted embodiment, the housing 218, cellular antenna 222, GPS antenna 220, and power source 226 are respectively positioned within cutouts 150A-D. Cutout 150C, which receives GPS antenna 220, is formed so that GPS antenna 220 will be disposed directly below and aligned with access ports 43 and 57 (FIG. 11) when top inside panel 38 and top outer panel 42 are folded over so as to close outer housing 12 (see FIG. 18). Cutout 150C is generally sized so that GPS antenna 220 will snugly fit therein. For a more secure fit, adhesive or other securing method can be used. Because the cutout 150C is configured to snugly receive GPS antenna 220, cutout 150C is generally sized to be about the same size as the GPS antenna 220.

Upper layer 17 comprises cardboard, foam, or other material that is shaped to snugly fit within outer housing 12. Alternatively, and/or in conjunction with upper layer 17, the recesses 150 can be formed on the top surface of lid 68 into which temperature/location tracker 202 can be received.

Either before or after being placed within cutouts 150, the peripheral components of temperature/location tracker 202 are connected to the housing 218 if not already connected. For example, connector 266 of electrical cable electrical cable 264 is attached to connector 228 of temperature/location tracker 202 corresponding to the temperature controller 216. If a second temperature probe 224 is used, the second probe 224 is positioned above lid 68 and the corresponding connector 266 is also connected to a connector 228 corresponding to the temperature controller 216. GPS antenna 220 and cellular antenna 222 are respectively connected to temperature/location tracker 202 via connectors 236 and 244. As soon as power source 226 is connected, temperature/location tracker 202 is turned on. Alternatively, a switch can be included on the temperature/location tracker 202 to turn on the unit.

Figure 16:
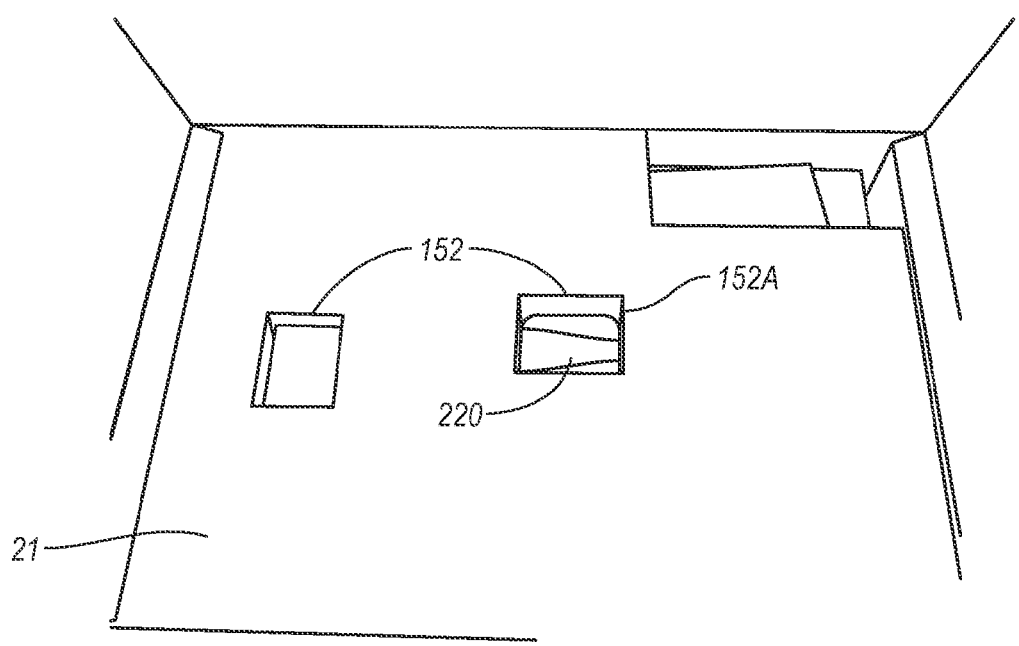
FIG. 16 is a perspective view of the fully assembled shipper shown in FIG. 15 with the second upper layer positioned therein.

Returning to FIG. 10, a second upper layer 21 is positioned above upper layer 17 to cushion and protect temperature/location tracker 202 and its components, as shown in the depicted embodiment. Second upper layer 21 can comprise the same types of materials discussed above with regard to upper layer 17. As shown in FIG. 16, one or more cutouts 152 are formed extending all the way through the second upper layer 21. Similar to the upper layer 17, one of the cutouts 152A is positioned such that the cutout 152A will be disposed above and aligned with cutout 150C of upper layer 17 as well as access ports 43 and 57 when top inside panel 38 and top outer panel 42 are folded over so as to close outer housing 12 (see FIG. 18). As a result, when GPS antenna 220 is positioned within upper layer 17, the GPS antenna 220 is freely exposed and accessible from outside the shipper 10. Cutout 152A is sized and shaped similar to cutout 150C, although some variation is possible. In alternative embodiments, second upper layer 21 can be omitted.

Figure 17:
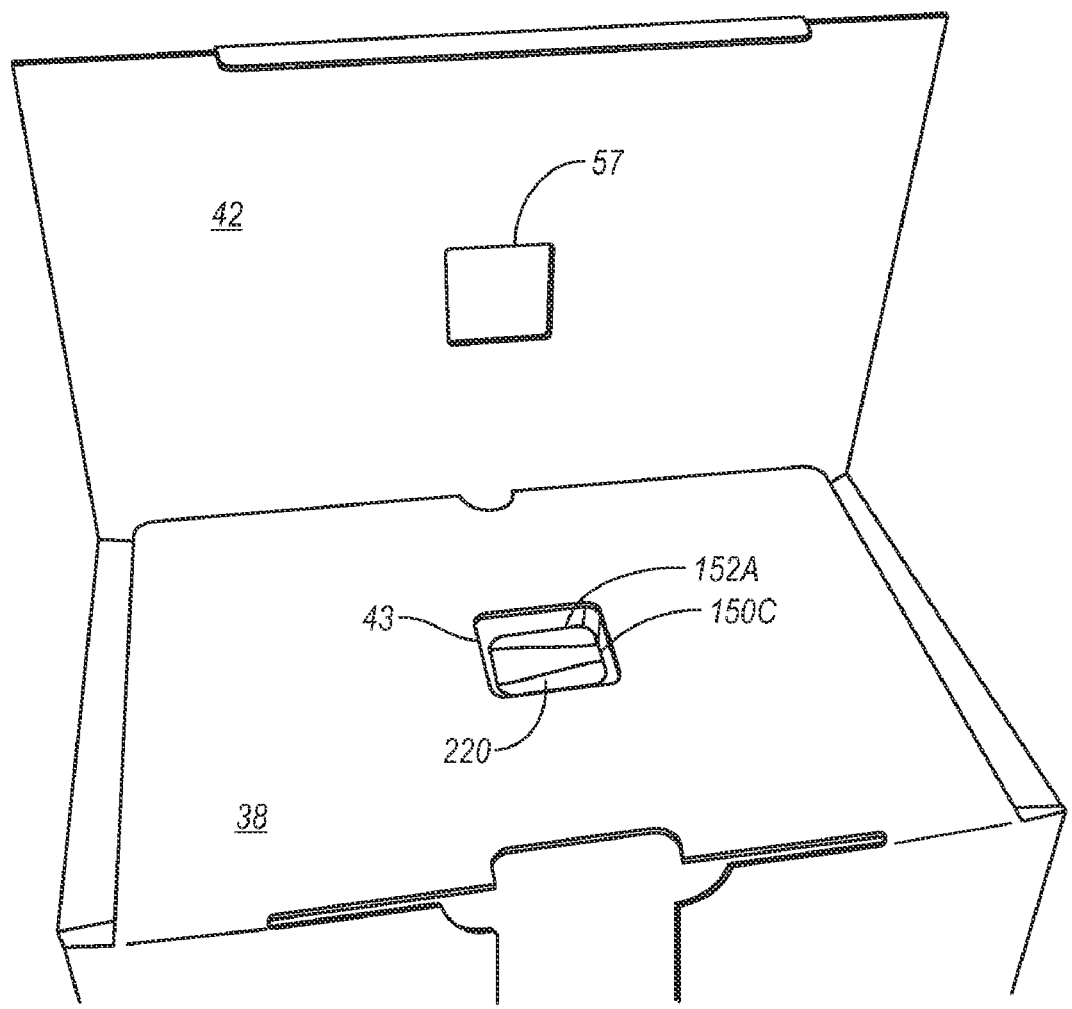
FIG. 17 is a perspective view of the fully assembly shipper shown in FIG. 16 wherein the outer housing is partially closed.

With reference to FIG. 11, once temperature/location tracker 202 is secured in place within upper layer 17 and second upper layer 21 is positioned above upper layer 17, top inside panel 38 is folded over so as to cover second upper layer 21. In this position, as shown in FIG. 17, cutouts 150C and 152A, as well as GPS antenna 220 positioned within cutout 150C, are aligned with access port 43 of top inside panel 38. In some embodiments, GPS antenna 220 can be disposed at least partially within access port 43.

Figure 18:
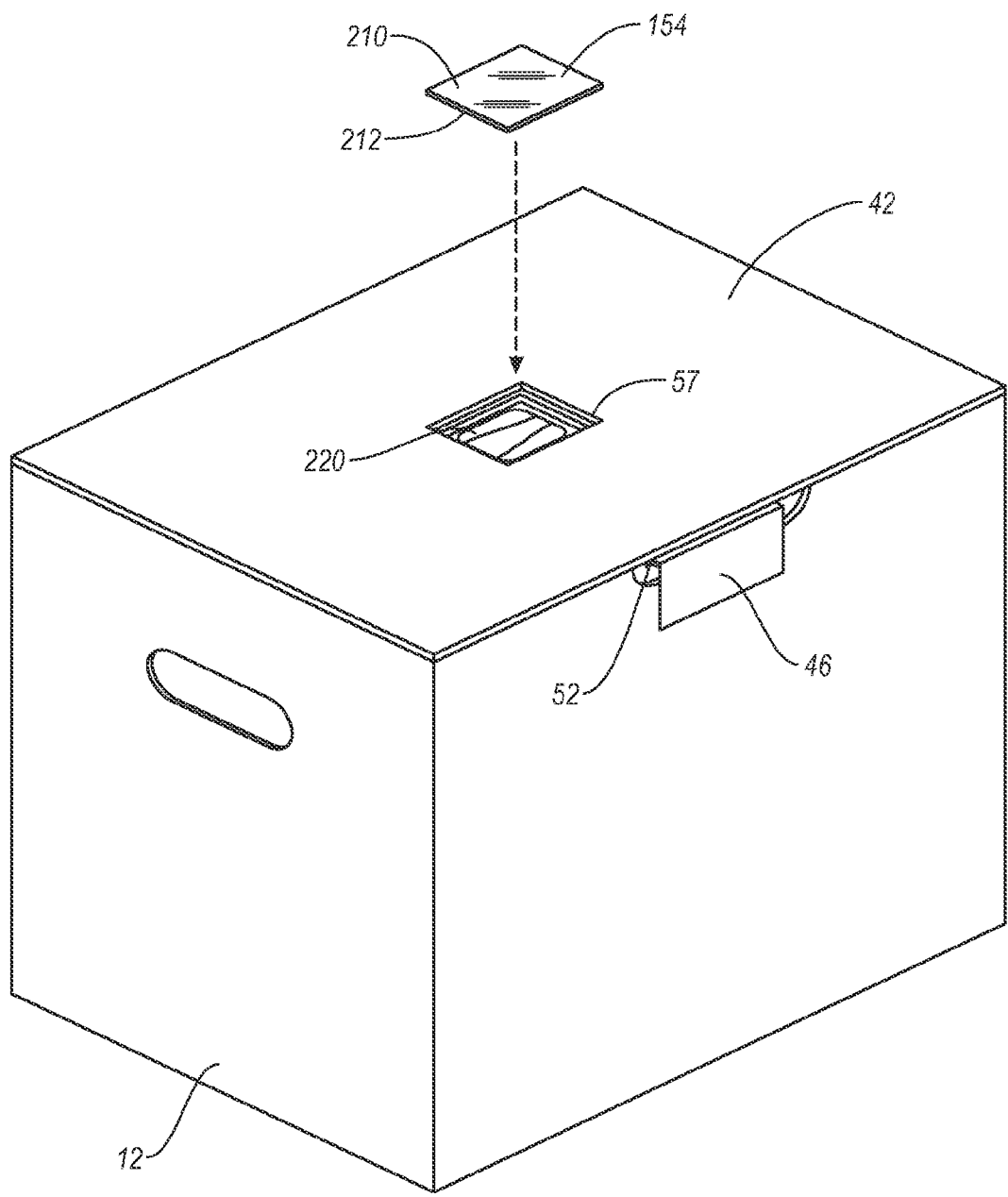
FIG. 18 is a perspective view of the fully assembled shipper shown in FIG. 17 wherein the outer housing is fully closed.

With continued reference to FIG. 11, top outer panel 42 is then folded over top inside panel 38 so that access port 57 is aligned with access port 43 of top inside panel 38. Engagement tab 50 is received within engagement slot 48 while locking tab 46 is then received within locking slot 52, thereby securely closing outer housing 12 for shipping as shown in FIG. 18. In this position, GPS antenna 220 is also aligned with access port 57 in top outer panel 42. In some embodiments, GPS antenna 220 can be disposed at least partially within access port 57.

As discussed above, in the assembled state shown in FIG. 18, GPS antenna 220 is freely exposed to the exterior of shipping container 204 by virtue of its placement within cutout 150C and alignment directly below open access ports 43 and 57 and cutout 152A. This exposure leads to better reception of the GPS signal at the GPS antenna 220. However, the exposure can also cause the freely exposed GPS antenna 220 to be more susceptible to damage from exterior elements. To help prevent damage from such exposure, a covering 154 can be placed over or within access port 57, access port 43, cutout 152A or cutout 150C that minimally affects the GPS signal reception. For example, in the depicted embodiment covering 154 is shown as being positioned over access port 57. Covering 154 comprises a thin sheet of material having a first side 210 and an opposing second side 212 that allows the GPS signal to pass therethrough. Covering 154 can comprise a clear sheet, such as cellophane packing tape, or a thin opaque material, such as paper backed packing tape. Other types of coverings 154 that can be used include paper, thin cardboard, fabric, or the like. In some embodiments, covering 154 has a thickness between the first side 210 and the second side 212 that is less than about 1 mm or less than about 0.1 mm or less than about 0.01 mm. Other values for the thickness of covering 154 are also possible.

It is appreciated that shipper 10 is but one example of a shipper that can be used with the present invention. Other shippers incorporating conventional or non-conventional style shipping containers can also be used.

As can be appreciated, more than one shipper 10, each incorporating a temperature/location tracker 202, can be concurrently used in the system 200. To facilitate tracking and communication with each temperature/location tracker 202, each tracker 202 includes a unique identifier to differentiate the tracker 202 from other trackers 202 within the system. Because of this, before the top inside panel 38 and top outer panel 42 are closed, the shipping entity identifies the unique identifier corresponding to the temperature/location tracker 202. This identifier is then used with all communications to/from temperature/location tracker 202 to identify the particular tracker 202 being communicated with. This identifier is typically printed on the housing 218.

To initiate the shipping process, the temperature/location tracker 202 is first initialized with various data and parameters. This can be done by the remote user 206 using a web-based application or a dedicated computer running a dedicated program. One example of such a program that can be used with the present invention is Neoris ActiveSuite, utilizing the ATTempLocate module software to receive the captured data for analysis and reporting. Other software can also be used. As noted above, any communication with the temperature/location tracker 202 will use the unique identifier corresponding to the tracker, as is known in the art.

The initialization may include one or more of the following:

Assigning a unique shipment identifier or tracking number. This number can then be used when sending data to the temperature/location tracker 202 or receiving tracking or alert communications from the temperature/location tracker 202.

Establishing the temperature minimum and maximum values. These values are then used by the temperature/location tracker 202 to determine if and when any out-of-range temperature readings occur.

Assigning temperature alert and notification recipients. These values represent which remote users are notified whenever an out-of-range temperature or other event occurs at the temperature/location tracker 202.

Establishing the temperature capture intervals. These values are then used by the temperature/location tracker 202 to determine how often the temperature is to be recorded to the data logger 214.

Establishing the GPS position capture interval. This value is then used by the temperature/location tracker 202 to determine how often the GPS is to be recorded to the data logger 214. Typically, the GPS position capture interval and the temperature capture interval will be the same.

Establishing the cellular communication interval. This value is used by the temperature/location tracker 202 to determine how often to send the temperature and location tracking information recorded in the data logger 214 to the remote user 206.

Establishing communication 'blackout' periods. This value is used to determine how long the temperature/location tracker 202 should wait before attempting to reconnect to the remote user 206 after the cellular signal is lost.

Receiving programming confirmation from the Device. Once the initialization is complete, a confirmation from the device will verify that the initialization was completed successfully.

Once the initialization has been successfully completed, shipment of the shipper 10 can occur. During shipment, the temperature/location tracker 202 periodically monitors and records the temperature within compartment 78 of cooling assembly 15, thereby concurrently measuring the temperature of payload 205. If desired, the temperature/location tracker 202 also monitors and records the temperature of the portion of the shipper 10 external to the cooling assembly 15. The temperatures of the payload 205 and shipper 10 are determined by the temperature controller 216 receiving input from the temperature probes 224. The temperature values are stored in the data logger 214. How often the temperature values are measured is determined by the temperature capture intervals discussed above.

During shipment, the temperature/location tracker 202 also periodically monitors and records the position of the shipper 10. The position is determined using the GPS receiver 210 and GPS antenna 220 as is known in the art. The position values are stored in the data logger 214 so as to correlate with the temperature values. A time stamp may also be included to correlate the values. If no GPS fix is available, this will be noted with the corresponding temperature reading. How often the position values are determined is determined by the position capture intervals discussed above. In one embodiment, the temperature and position capture intervals are the same.

The temperature and position can be measured and recorded in a variety of different ways. For example, the temperature and position can be repeatedly measured at select time intervals, i.e., every fifteen seconds or once every minute, and then recorded against the corresponding time of day. It is appreciated that other scenarios for measuring and recording temperature, location, and time can also be used.

The temperature and position data stored within the data logger 214 is transmitted periodically to the remote user 206 over the cellular network 208 using the cellular modem 212. How often the transmissions occur is determined by the cellular communication interval discussed above. In one embodiment, the data is transmitted every 10 seconds to every 10 minutes, with about every minute being common. Other transmission rates are also possible. Because the data are transmitted over a cellular network, the cellular modem 212 can determine if a connection exists. If no cellular connection exists or a prior connection is lost, the temperature and position data remains stored in the data logger 214 until the connection is established and the data can be transmitted at that time. Using a cellular connection instead of a satellite connection provides the benefit of better coverage, especially when not in line of site of the sky.

Besides the periodic sending of data to the remote user 206, the temperature/location tracker 202 can also transmit "alerts" to the remote user and to the notification recipients discussed above when the temperature of the shipment exceeds the ranges set up during the installation process. These "alerts" can be initiated by the temperature/location tracker 202 or by an application at the remote user 206.

Upon receiving any data from the temperature/location tracker 202, applications at the remote user can be used to view or manipulate the data. As noted above, one example of such a program that can be used with the present invention is Neoris ActiveSuite, utilizing the ATTempLocate module software to receive the captured data for analysis and reporting. If desired, the remote user 206 can make any of the data received from the temperature/location tracker 202 available over the internet for remote viewing. Also, the remote user can transmit commands to the tracker 202 over the cellular network 208 to reconfigure any of the settings previously initialized. Furthermore, the remote user can remotely disable the cellular modem 212 or the GPS receiver to conserve energy, if desired. Also, as discussed above, the remote user 206 can send "alerts" to the notification recipients, if desired.

Being able to view temperature and location data of temperature controlled shipments in real time (or nearly real time) allows the user of the system to be better informed of the shipment conditions and to know of any out-of-range temperature conditions as soon as they happen so that a plan of action can more quickly be formed. For example, in currently available systems, if an out-of-range temperature condition occurs in a shipment, a replacement shipment cannot be sent until the original shipment has gone through the entire shipping process, as the out-of-range anomaly does not become known to the user until the shipment is opened. However, with the current system, a replacement shipper can be sent immediately when the anomalous reading is determined, while the original shipper is still en route. This can save a tremendous amount of time and money. Furthermore, using the current system, the location of any anomalous reading can be determined with any shipper so that measures can be taken to correct any problems that may be causing the anomalous readings. Trends can also be tracked using the current system.

Once the shipper 10 arrives at its final destination, the operator opens top outer panel 42 and top inside panel 38 and removes the upper layer 17 (and second layer 21, if used), along with the tracker 202. The temperature and location monitoring can be turned off at this point or earlier using remote commands sent to the temperature/location tracker 202 via the cellular network 208 or by manually turning off the temperature/location tracker 202.

Payload 205 is removed from shipper 10 by opening insulation assembly 14 and cooling assembly 15. Payload 205 is then moved to an environmentally controlled location or is otherwise used for its intended purpose. The temperature probe 224 disposed within insulation assembly 14 and cooling assembly 15 is likewise removed. Tracker 202 and its peripheral components, including the GPS antenna 220, cellular antenna 222, temperature probes 224, and power source 226 can then be recovered and returned to be re-used.

It is appreciated that other parameters besides temperature can also be measured and tracked using the current invention. For example, humidity, shock forces, or other parameters associated with the shipper 10 and/or payload 205 can also be monitored. To do so, corresponding sensors that measure those values would simply need to be attached to the controller 216 and those values monitored and compared against pre-defined out-of-limit values similar to the manner that temperature is monitored and compared.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A shipping package for transporting a temperature sensitive payload, the shipping package comprising:
   an outer housing comprising:
      a body having an interior surface bounding a compartment that is accessed through a top opening; and
      a first panel coupled with the body and configured to extend over at least a portion of the top opening, a first access port extending through the first panel;
   an insulated container disposed within a first portion of the compartment of the outer housing, the insulated container comprising:

an inner housing having an interior surface bounding a cavity that is accessed through a second opening, the cavity being configured to receive a temperature sensitive payload; and a lid positionable on the inner housing so as to cover the second opening; and a temperature/location tracker disposed within the compartment of the body, the temperature/location tracker comprising:

a first temperature probe disposed within the cavity of the insulated container and configured to measure a temperature of a temperature sensitive payload when the temperature sensitive payload is positioned within the cavity;

a GPS receiver disposed in a second portion of the compartment;

a cellular modem disposed in the second portion of the compartment; and a GPS antenna disposed in the second portion of the compartment so as to be aligned with the first access port when the shipping package is in a fully assembled state such that the GPS antenna is directly accessible through the first access port, wherein the temperature/location tracker is configured to monitor and periodically transmit temperature values corresponding to a temperature sensitive payload and location values corresponding to the shipping package over a cellular communication network.

2. The shipping package as recited in claim 1, wherein the outer housing further comprises a second panel coupled with the body and configured to extend over the first panel, a second access port extending through the second panel so as to be aligned with the first access port when the shipping package is in a fully assembled state such that the GPS antenna is directly accessible through the first and second access ports.

3. The shipping package as recited in claim 1, wherein the GPS antenna is freely exposed when the shipping package is in a fully assembled state.

4. The shipping package as recited in claim 1, wherein the GPS antenna is viewable through the first access port when the shipping package is in a fully assembled state.

5. The shipping package as recited in claim 1, wherein the GPS antenna is disposed within the first access port when the shipping package is in a fully assembled state.

6. The shipping package as recited in claim 1, wherein the first access port has a cross sectional area between about 700 mm² and about 5000 mm².

7. The shipping package as recited in claim 1, further comprising a covering positioned over or within the first access port.

8. The shipping package as recited in claim 7, wherein the covering is less than 0.01 mm thick.

9. The shipping package as recited in claim 1, wherein the temperature/location tracker further comprises a data logger configured to store the temperature and location values.

10. The shipping package as recited in claim 1, wherein the temperature/location tracker is self contained so as to be reusable.

11. The shipping package as recited in claim 1, further comprising a temperature sensitive payload disposed within the insulated container.

12. The shipping package as recited in claim 11, wherein the temperature/location tracker further comprises a second temperature probe, the second temperature probe being disposed in the second portion of the compartment.

13. The shipping package as recited in claim 11, wherein the temperature sensitive payload comprises one or more of the following: a cell culture, a vaccine, a body tissue, blood, and a pharmaceutical.

14. A shipping system comprising:
a shipping package as recited in claim 1;
a remote monitor configured to receive the temperature and location values that are periodically transmitted by the temperature/location tracker over the cellular communication network.

15. The shipping package as recited in claim 1, wherein the outer housing is comprised of cardboard.

16. The shipping package as recited in claim 1, wherein the outer housing is comprised of one or more of the following: plastic, fiberglass, and wood.

17. The shipping package as recited in claim 1, wherein the temperature/location tracker further comprises a controller that is electrically coupled to the GPS receiver, the cellular modem, the GPS antenna, and the first temperature probe.

18. The shipping package as recited in claim 1, wherein the GPS receiver, the cellular modem, and the GPS antenna rest on the lid of the inner housing.

19. A shipping system comprising:
a plurality of shipping packages, each as recited in claim 1;
a remote monitor configured to receive the temperature and location values periodically transmitted by the temperature/location tracker of each shipping package over the cellular communication network.

20. A method of monitoring a shipping package in transit, the method comprising:
securing a temperature sensitive payload and a first temperature probe within an insulated container disposed within a compartment of an outer housing of a shipping package and coupling the first temperature probe with a temperature/location tracker positioned within a portion of the compartment outside of the insulated container;
measuring a temperature of the payload using the first temperature probe and passing a signal representative of the measured temperature from the first temperature probe to the temperature/location tracker;
determining a location of the shipping package using the temperature/location tracker; and
transmitting, by the temperature/location tracker, values representing the measured temperature and determined location to a remote monitor over a cellular communication network.

21. The method as recited in claim 20, wherein the acts of measuring the temperature, determining the location, and transmitting values are repeated on a periodic basis.

22. The method as recited in claim 21, further comprising:
determining, by the temperature/location tracker, when cellular communication has been lost, and when it is determined that cellular communication has been lost:
continuing to periodically measure the temperature of the payload and determine the location of the shipping package;
storing the temperature and location values in a data logger; and
transmitting, by the temperature/location tracker, the stored temperature and location values over the cellular communication network when the temperature/location tracker determines that cellular communication has been reestablished.

23. The method as recited in claim 20, further comprising:
measuring a second temperature representing the temperature of the portion of the compartment disposed outside of the insulated container, and transmitting, by the temperature/location tracker, a value representing the measured second temperature to the remote monitor over the cellular communication network.

24. The method as recited in claim 20, wherein determining the location of the shipping package comprises receiving, by the temperature/location tracker, an external GPS signal and determining the location therefrom.

25. The method as recited in claim 20, further comprising the shipping package or the remote monitor alerting a remote user when the measured temperature is outside of a predefined limit.

26. The method as recited in claim 25, wherein the predefined limit is a maximum temperature value.

27. The method as recited in claim 20, further comprising the shipping package transmitting a time stamp with each temperature and location value, the time stamp corresponding to a relative time when each measured value was obtained.

28. The method as recited in claim 27, wherein the time stamp is derived from a GPS signal.

29. The method as recited in claim 20, further comprising receiving, by the temperature/location tracker, programming instructions over the cellular communication network.

30. The method as recited in claim 20, further comprising positioning the shipping package in a shipping container after the payload and the first temperature probe have been secured within the insulated container.

* * * * *